United States Patent
Lee

(10) Patent No.: US 11,017,486 B2
(45) Date of Patent: May 25, 2021

(54) ELECTRONIC DEVICE AND CONTROL METHOD THEREFOR

(71) Applicant: SAMSUNG ELECTRONICS CO., LTD., Suwon-si (KR)

(72) Inventor: Mu-woong Lee, Seongnam-si (KR)

(73) Assignee: SAMSUNG ELECTRONICS CO., LTD., Suwon-si (KR)

(*) Notice: Subject to any disclaimer, the term of this patent is extended or adjusted under 35 U.S.C. 154(b) by 0 days.

(21) Appl. No.: 16/479,331

(22) PCT Filed: Feb. 22, 2018

(86) PCT No.: PCT/KR2018/002168
§ 371 (c)(1),
(2) Date: Jul. 19, 2019

(87) PCT Pub. No.: WO2018/155919
PCT Pub. Date: Aug. 30, 2018

(65) Prior Publication Data
US 2019/0355073 A1    Nov. 21, 2019

(30) Foreign Application Priority Data
Feb. 22, 2017  (KR) .......................... 10-2017-0023362

(51) Int. Cl.
*G06Q 50/10* (2012.01)
*G06F 3/01* (2006.01)
(Continued)

(52) U.S. Cl.
CPC ............. *G06Q 50/10* (2013.01); *G06F 3/011* (2013.01); *G06F 9/455* (2013.01); *G06F 9/5044* (2013.01); *G06T 19/006* (2013.01)

(58) Field of Classification Search
CPC ......... G06Q 50/10; G06F 3/011; G06F 9/455; G06F 9/5044; G06F 9/5011; G06F 3/016;
(Continued)

(56) References Cited

U.S. PATENT DOCUMENTS 8,907,981 B2   12/2014  Betzler et al.
8,941,560 B2   1/2015   Wong et al.
(Continued)

FOREIGN PATENT DOCUMENTS

EP   1708501 A1 * 10/2006 ........... H04N 5/9201
JP   2006-031665 A    2/2006
(Continued)

OTHER PUBLICATIONS

Written Opinion (PCT/ISA/237) issued by the International Searching Authority in International Application No. PCT/KR2018/002168, dated Jun. 5, 2018.
(Continued)

*Primary Examiner* — Caroline H Jahnige
(74) *Attorney, Agent, or Firm* — Sughrue Mion, PLLC

(57) ABSTRACT

An electronic device and a control method therefor are disclosed. An electronic device according to the present invention comprises: a communication unit for performing data communication with at least one peripheral device; an output unit for outputting virtual environment content; and a control unit for controlling the output unit so as to play the virtual environment content according to a user command, determining the peripheral device, which can provide a function corresponding to a virtual effect, among peripheral devices of which there is at least one, on the basis of information on the virtual effect provided from the virtual environment content, and controlling the communication unit so as to transmit a control signal, which corresponds to the virtual effect, to the determined peripheral device. There-
(Continued)

fore, the electronic device playing the virtual environment content provides the virtual effect related to the playing virtual environment content by using the peripheral device, thereby enabling an experience related to various virtual environments to be provided to a user.

11 Claims, 14 Drawing Sheets

(51) Int. Cl.
*G06F 9/455* (2018.01)
*G06F 9/50* (2006.01)
*G06T 19/00* (2011.01)

(58) Field of Classification Search
CPC .............. G06F 3/04815; G06F 1/1605; G06T 19/006; H04L 29/08; H04L 67/12; H04L 12/2816; H04L 12/2803; H04M 1/725; H04N 13/30; H04N 13/332; H04W 4/00; H04W 4/80
See application file for complete search history.

(56) References Cited

U.S. PATENT DOCUMENTS

| | | |
|---|---|---|
| 9,218,212 B2 | 12/2015 | Do et al. |
| 2009/0089685 A1 | 4/2009 | Mordecai et al. |
| 2012/0050325 A1 | 3/2012 | Joo et al. |
| 2012/0188256 A1 | 7/2012 | Lee et al. |
| 2013/0038601 A1 | 2/2013 | Han et al. |
| 2013/0125113 A1* | 5/2013 | Do .................. G06F 9/5044 718/1 |
| 2017/0043255 A1* | 2/2017 | Savolainen ........... A63F 13/335 |

FOREIGN PATENT DOCUMENTS

| | | |
|---|---|---|
| JP | 4984771 B2 | 7/2012 |
| JP | 2015-146194 A | 8/2015 |
| KR | 10-2010-0121420 A | 11/2010 |
| KR | 10-2012-0019007 A | 3/2012 |
| KR | 10-1251774 B1 | 4/2013 |
| KR | 10-2015-0106772 A | 9/2015 |
| KR | 10-1680142 B1 | 11/2016 |

OTHER PUBLICATIONS

International Search Report (PCT/ISA/210), issued by International Searching Authority in International Application No. PCT/KR2018/002168, dated Jun. 5, 2018.

* cited by examiner

ELECTRONIC DEVICE AND CONTROL METHOD THEREFOR

TECHNICAL FIELD

The disclosure relates to an electronic device and a control method therefor and, more particularly, to an electronic device for providing a service of a virtual effect provided by a virtual environment content using a peripheral device in an electronic device and a control method therefor.

BACKGROUND ART

With the recent development of electronic technology, a user may experience various virtual environments through virtual reality (VR) content (hereinafter referred to as virtual environment content) reproduced in an electronic device.

For example, an electronic device for providing a virtual environment service may, when a selection commend for a specific content is inputted, receive the corresponding content from a peripheral device providing the selected specific content, and provide the received content in a virtual environment.

In other words, a conventional electronic device only provides a virtual environment service which merely provides various content information to a user in a virtual environment by utilizing a peripheral device.

Accordingly, a virtual environment service which may provide an experience for various virtual environments through an electronic device needs to be developed.

DISCLOSURE

Technical Problem

The disclosure has been made in order to solve the above-mentioned problems, and the purpose is to provide a virtual environment service capable of providing an experience for various virtual environments in an electronic device.

Technical Solution

According to an embodiment of the disclosure to achieve the above-described object, an electronic device includes a communicator configured to perform data communication with at least one peripheral devices, an outputter configured to output a virtual environment content, and a controller to control the outputter to reproduce the virtual environment content according to a user command, and determine a peripheral device which is capable of providing a function corresponding to the virtual effect, from among the at least one peripheral devices, based on information on the virtual effect provided by the virtual environment content, and control the communicator to transmit a control signal corresponding to the virtual effect to the determined peripheral device.

The electronic device may further include a storage configured to store function support device information to which information on the virtual effect and information on a pre-registered peripheral device capable of providing a function corresponding to the virtual effect are mapped.

The controller may determine whether a peripheral device capable of providing a function corresponding to the virtual effect provided by the virtual environment content is registered based on device management information stored in the storage, and based on a peripheral device capable of providing a function corresponding to the virtual effect being registered, control the communicator to transmit a control signal corresponding to the virtual effect to the registered peripheral device.

The controller may, based on a determination that a peripheral device capable of providing a function corresponding to the virtual effect is unregistered, transmit a search signal for searching a peripheral device and receive a response signal from at least one peripheral devices which receive the search signal, and control the communicator to perform pairing with a peripheral device which is capable of providing a function corresponding to the virtual effect based on the received response signal.

The information on the virtual effect may be mapped and stored by frames constituting the virtual environment content, and the controller may, based on the virtual environment content being reproduced, control the communicator to transmit a control signal to a peripheral device capable of performing a function corresponding to the virtual effect by the frames based on information on the virtual effect by the frames for the virtual environment content.

The controller, upon receiving a reproduction command for the virtual environment content, may control the outputter to display a user UI for providing a service for the virtual effect provided by the virtual environment content.

The controller may, while the virtual environment content is being outputted, upon receiving event information from a peripheral device which is set by a user from among the plurality of pre-registered peripheral devices, control the outputter to convert and output the received event information to information related to the virtual environment content.

The controller may transmit a control signal to a peripheral device to perform a function corresponding to the virtual effect provided by the virtual environment content according to whether the electronic device is capable of performing a function corresponding to the virtual effect provided by the virtual environment content.

The virtual effect may include at least one of a sound effect, wind effect, vibration effect, heat effect, and odor effect.

According to still another embodiment, a control method of an electronic device includes reproducing a virtual environment content according to a user command; determining a peripheral device which is capable of providing a function corresponding to the virtual effect, from among the at least one peripheral devices, based on information on the virtual effect provided by the virtual environment content; and reproducing the virtual environment content and transmitting a control signal corresponding to the virtual effect to the determined peripheral device.

The method may further include storing function support device information to which information on the virtual effect and information on a pre-registered peripheral device capable of providing a function corresponding to the virtual effect are mapped.

The determining may include determining whether a peripheral device capable of providing a function corresponding to the virtual effect provided by the virtual environment content is registered based on device management information stored in the storage, and the transmitting may include, based on a peripheral device capable of providing a function corresponding to the virtual effect being registered, transmitting a control signal corresponding to the virtual effect to the registered peripheral device.

The method may further include registering an unregistered peripheral device, and the registering may include, based on a determination that a peripheral device capable of providing a function corresponding to the virtual effect is unregistered, transmitting a search signal for searching a peripheral device; receiving a response signal from at least one peripheral devices which receive the search signal; and performing pairing with a peripheral device which is capable of providing a function corresponding to the virtual effect based on the received response signal.

The information on the virtual effect may be mapped and stored by frames constituting the virtual environment content, and the transmitting may include, based on the virtual environment content being reproduced, transmitting a control signal to a peripheral device capable of performing a function corresponding to the virtual effect by the frames based on information on the virtual effect by the frames for the virtual environment content.

The reproducing may include, upon receiving a reproduction command for the virtual environment content, displaying a user UI for providing a service for the virtual effect provided by the virtual environment content.

The reproducing may include, while the virtual environment content is being outputted, upon receiving event information from a peripheral device which is set by a user from among the plurality of pre-registered peripheral devices, converting and outputting the received event information to information related to the virtual environment content, and reproducing the information.

The determining may include determining whether the electronic device is capable of performing a function corresponding to the virtual effect provided by the virtual environment content, and if the electronic device is capable of performing the function corresponding to the virtual effect provided by the virtual environment content, performing a function corresponding to the virtual effect by the electronic device.

The virtual effect may include at least one of a sound effect, wind effect, vibration effect, heat effect, and odor effect.

Advantageous Effects

According to the embodiment, the electronic device for reproducing a virtual environment content may provide a user with an experience of various virtual environments by providing a virtual effect related to the virtual environment content being reproduced by using a peripheral device.

BEST MODE

Figure 1:
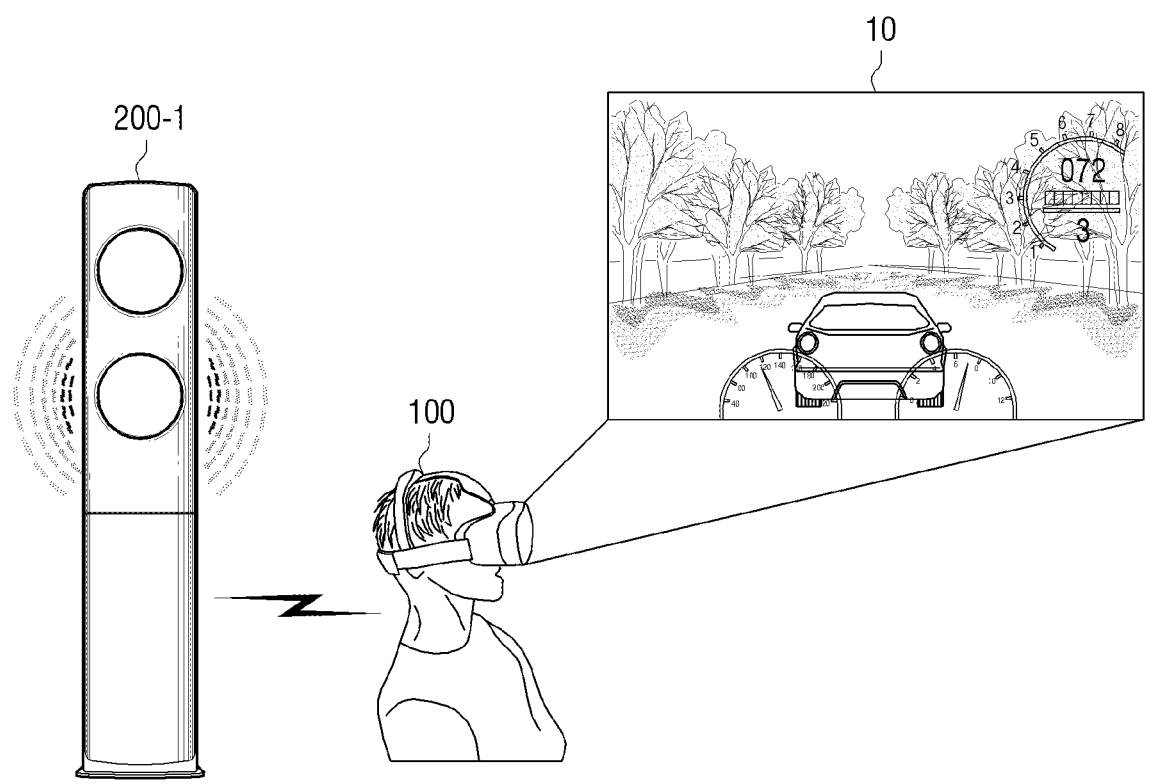
FIG. 1 is system diagram to provide a virtual environment service using a peripheral device according to an embodiment.

Before specifically describing the disclosure, a method for demonstrating the present specification and drawings will be described. First of all, the terms used in the present specification and the claims are general terms identified in consideration of the functions of the various embodiments of the disclosure. However, these terms may vary depending on intention, legal or technical interpretation, emergence of new technologies, and the like of those skilled in the related art. Also, there may be some terms arbitrarily identified by an applicant. Unless there is a specific definition of a term, the term may be construed based on the overall content and technological common sense of those skilled in the related art.

Further, like reference numerals indicate like components that perform substantially the same functions throughout the specification. For convenience of descriptions and understanding, the same reference numerals or symbols are used and described in different embodiments. In other words, although elements having the same reference numerals are all illustrated in a plurality of drawings, the plurality of drawings do not mean one embodiment.

The terms such as "first," "second," and so on may be used to describe a variety of elements, but the elements should not be limited by these terms. The terms are used only for the purpose of distinguishing one element from another. For example, the elements associated with the ordinal numbers should not be limited in order or order of use by the numbers. If necessary, the ordinal numbers may be replaced with each other.

A singular expression includes a plural expression, unless otherwise specified. It is to be understood that the terms such as "comprise" or "consist of" are used herein to designate a presence of a characteristic, number, step, operation, element, component, or a combination thereof, and not to preclude a presence or a possibility of adding one or more of other characteristics, numbers, steps, operations, elements, components or a combination thereof.

The term such as "module," "unit," "part", and so on is used to refer to an element that performs at least one function or operation, and such element may be implemented as hardware or software, or a combination of hardware and software. Further, except for when each of a plurality of "modules", "units", "parts", and the like needs to be realized in an individual hardware, the components may be integrated in at least one module or chip and be realized in at least one processor.

Also, when any part is connected to another part, this includes a direct connection and an indirect connection through another medium. Further, when a certain portion includes a certain element, unless specified to the contrary, this means that another element may be additionally included, rather than precluding another element.

The embodiment of the disclosure will be further described with reference to the attached drawings.

FIG. 1 is system diagram to provide a virtual environment service using a peripheral device according to an embodiment.

As illustrated in FIG. 1, a system for providing a virtual environment service includes an electronic device 100 for reproducing a virtual environment content and a peripheral device 200 for providing a function corresponding to a virtual effect provided by the virtual environment content.

Here, the virtual environment content is a VR image content such as a panorama image or a 360-degree around view, and the electronic device 100 for reproducing the virtual environment content may be a VR device, a smartphone, a VR wearable device, and the like.

The peripheral device 200 providing a function corresponding to the virtual effect provided by the virtual environment content may be an Internet of Things (IoT) device which may perform local area communication with the electronic device 100 and perform an operation according to a control command of the electronic device 100, and may be, for example, a smart airconditioner as illustrated, a smart lighting device, a remote controller, a smartphone, a smart camera, an aromatic device, or the like.

Specifically, as illustrated, the electronic device 100 reproduces a virtual environment content 10 corresponding to a user command, according to a user command of a user wearing the electronic device 100. Accordingly, the user may play a car racing game in the virtual environment through the virtual environment content 10 reproduced through the electronic device 100 worn by the user.

The electronic device 100, upon receiving a user command for the virtual environment content 10 related to the car racing game, may search the peripheral device 200 capable of providing a function corresponding to the virtual effect provided by the virtual environment content 10 based on the information on the virtual effect provided by the virtual environment content 10.

Here, the information on the virtual effect provided by the virtual environment content 10 may be predetermined by the virtual environment contents.

For example, the virtual environment content 10 as illustrated may be a content providing a car racing game with the desert as a background. In this case, the virtual effect information provided by the virtual environment content 10 may include the information of a "heat effect" and a "wind effect".

In this case, the electronic device 100 determines the peripheral device 200 capable of providing a function corresponding to the virtual effect for the "heat effect" and the "wind effect", based on the pre-stored device management information and information on "heat effect" and "wind effect".

Here, the device management information is information in which at least two of information on the virtual effect provided by the virtual environment content 10, the information of a device capable of providing a function corresponding to the virtual effect, and information on the peripheral device 200 pre-registered in the electronic device 100 are mapped.

Therefore, the electronic device 100 determines whether information on the peripheral device 200 capable of providing a function corresponding to the virtual effect for "heat effect" and "wind effect" with reference to the device management information is registered.

As a result of the determination, if it is determined that the virtual effect for the "heat effect" and the "wind effect" and the device management information matched with a peripheral device 200-1 related to cooling and heating airconditioner are prestored, the electronic device 100 transmits a control signal related to warm wind to the peripheral device 200-1 related to the cooling and heating airconditioner so that warm wind blows around the user while the virtual environment content 10 requested by the user is being reproduced.

Accordingly, the peripheral device 200-1 related to the cooling and heating airconditioner sends out the warm wind based on the control signal received from the electronic device 100. Accordingly, the user who plays the car racing game through the electronic device 100 is able to experience a virtual environment as if the user plays a car racing in the desert, through the warm wind sent from the peripheral device 200-1 related to cooling and heating airconditioner.

Figure 2:
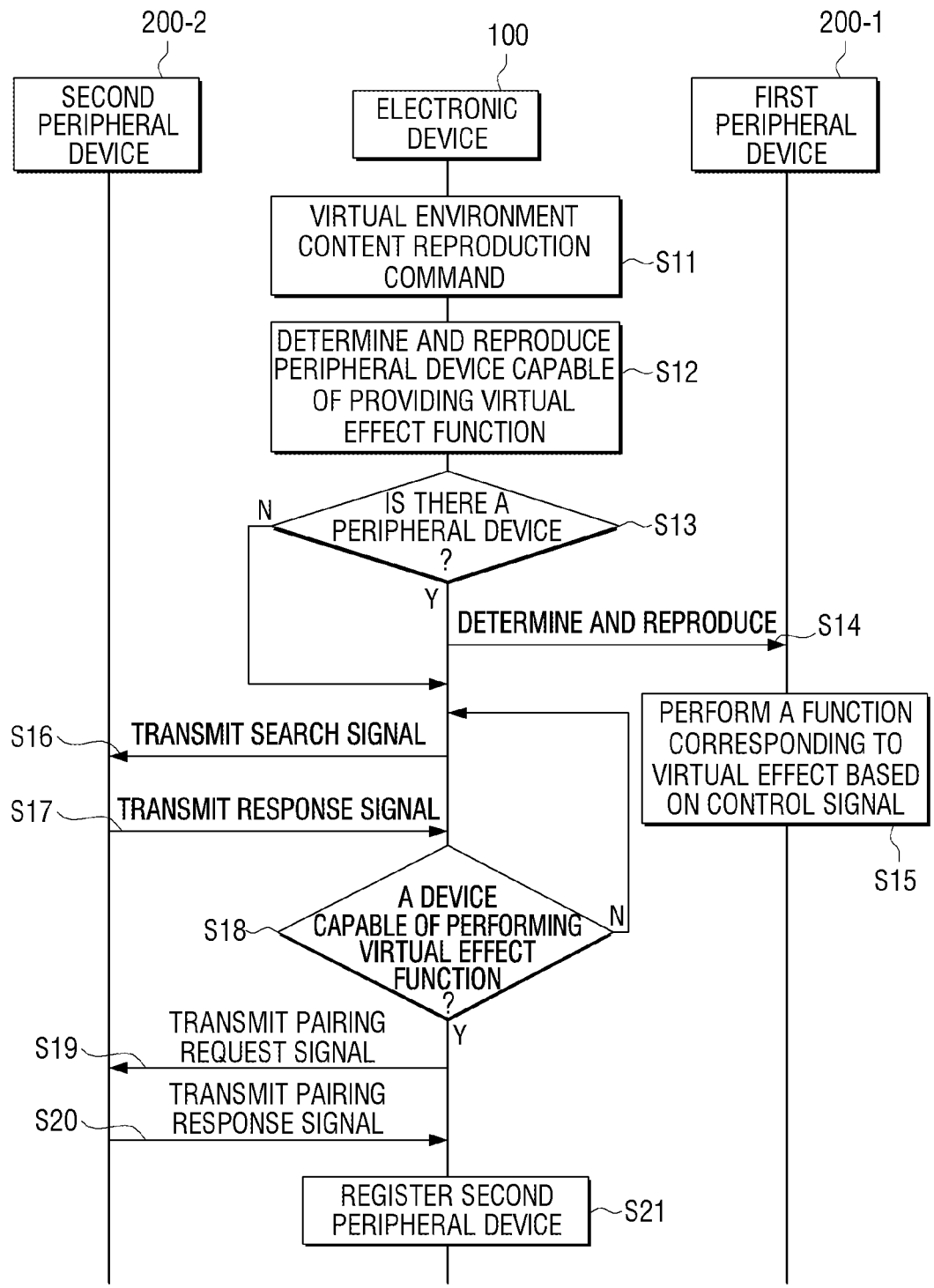
FIG. 2 is a procedure diagram to provide a virtual environment service using a peripheral device according to an embodiment.

FIG. 2 is a procedure diagram to provide a virtual environment service using a peripheral device according to an embodiment.

As illustrated in FIG. 2, the electronic device 100 receives a reproduction command for the virtual environment content from the user in step S11. When the user command is inputted, the electronic device 100 determines a peripheral device capable of providing a function corresponding to the virtual effect provided from the virtual environment content corresponding to the inputted user command, and reproduces the virtual environment content in step S12.

To be specific, when the user command is inputted, the electronic device 100 determines the peripheral device 200 capable of providing a function corresponding to the virtual effect provided by the virtual environment content corresponding to the user command based on the prestored device management information.

Here, the device management information is information in which at least two of information on the virtual effect provided by the virtual environment content, the information of a device capable of providing a function corresponding to the virtual effect, and information on the peripheral device 200 pre-registered in the electronic device 100 are mapped.

For example, the device management information may be mapped and stored as a format of a table as [Table 1] shown below.

TABLE 1

| Information on the virtual effect | Device information | Information on the peripheral device |
|---|---|---|
| Sound effect | First device signal pattern information | Network speaker |
| Wind effect | Second device signal pattern information | Smart airconditioner |
| Odor effect | Third device signal pattern information | Aromatic device |

In [Table 1], the signal pattern information of the first device mapped in relation to the sound effect may be a predetermined signal pattern with respect to the peripheral device 200 outputting audio. The signal pattern information of the second device mapped to the wind effect may be a predetermined signal pattern with respect to the peripheral device 200 transmitting the cold wind or the warm wind. The signal pattern information of the third device mapped with the odor effect may be a predetermined signal pattern with respect to the peripheral device 200 that emits the air freshener.

A network speaker (a speaker connectable to a network), a smart airconditioner, and an aromatic device mapped in correspondence with each of a sound effect, a wind effect, and an odor effect are peripheral devices 200 registered in the electronic device 100. Each of the network speaker, the smart airconditioner, and the aromatic device may be mapped to the effects matched to each of the first to third devices based on the signal pattern of each of the network speaker, the smart airconditioner, and the aromatic device, and the signal pattern information of each of the first to third devices.

However, the embodiment is not limited thereto, and the device information defined in the table above may be identification information for each of the first to third devices which are classified by devices providing a function corresponding to each virtual effect.

In this case, the network speaker having identification information corresponding to the identification information of the first device may be mapped to the sound effect, and the smart airconditioner having the identification information corresponding to the identification information of the second device may be mapped to the wind effect, and the aromatic device having the identification information corresponding to the identification information of the third device may be mapped to the odor effect.

However, the embodiment is not limited thereto, and the electronic device 100 may map the network speaker, smart airconditioner, and aromatic device to each of the sound effect, wind effect, and odor effect based on the user command.

Therefore, the electronic device 100 determines whether the peripheral device 200 capable of providing the virtual effect set in the virtual environment content corresponding to the user command is registered, with reference to the device management information in step S13.

As a result of the determination, the electronic device 100 may determine that the first peripheral device 200-1, from among the pre-registered peripheral devices 200, is capable of providing a function corresponding to the virtual effect that is set in the virtual environment content corresponding to the user command. In this case, the electronic device 100 transmits a control signal for performing a function corresponding to the virtual effect to the first peripheral device 200-1 based on the prestored device information relating to the first peripheral device 200-1 in step S14. Accordingly, the first peripheral device 200-1 performs a function corresponding to the virtual effect based on the control signal received from the electronic device 100 in step S15.

In the meantime, if the peripheral device 200 to provide the function corresponding to the virtual effect that is set to the virtual environment content to correspond to the user command in step S13 is not found, the electronic device 100 searches for a search signal to find a peripheral device in step S16. At this time, the electronic device 100 may transmit the search signal in a broadcast manner.

Accordingly, when receiving the search signal from the electronic device 100, a second peripheral device 200-2 capable of performing local area communication with the electronic device 100 transmits a response signal to the electronic device 100 in step S16.

When the response signal is received, the electronic device 100 determines whether the second peripheral device 200-2 is a device to provide a function corresponding to the virtual effect that is set in the virtual environment content corresponding to the user command in step S18.

For example, the virtual effect that is set to the virtual environment content corresponding to the user command may be wind effect. In this case, the electronic device 100 compares the signal pattern information of the second device mapped with the wind effect and the signal pattern included in the received response signal, by referring to the table of the device-related information as described above. As the result of the comparison, when the two signal patterns correspond to each other, the electronic device 100 transmits a pairing request signal to the second peripheral device 200-2 based on the address information included in the response signal received from the second peripheral device 200-2 in step S19.

However, the embodiment is not limited thereto, and the electronic device 100, when a response signal is received from the second peripheral device 200-2, provides a notification message notifying that the second peripheral device 200-2 has been searched. Thereafter, when a user command for the second peripheral device 200-2 is inputted, the electronic device 100 may transmit a pairing request signal to the second peripheral device 200-2 based on the address information included in the response signal.

The second peripheral device 200-2, when a pairing request signal is received from the electronic device 100, transmits a pairing response signal including control information of the second peripheral device 200-2 to the electronic device 100 in step S20. When the pairing response signal is received, the electronic device 100 may register the second peripheral device 200-2 as a device which performs a function corresponding to the wind effect in step S21.

That is, the electronic device 100 may update the device management information to which the wind effect and the control information of the second peripheral device 200-2 are mapped, and register the second peripheral device 200-2 as a device to perform a function corresponding to the wind effect.

Thereafter, the electronic device 100, while the virtual environment content corresponding to the user command is being reproduced, transmits a control signal for performing a function corresponding to the virtual effect provided by the virtual environment content as the second peripheral device 200-2. Therefore, the second peripheral device 200-2 may perform a function corresponding to the virtual effect provided by the virtual environment content based on the control signal received from the electronic device 100.

Hereinbelow, each configuration of the electronic device 100 which provides the virtual environment service using the peripheral device 200 will be described.

Figure 3:
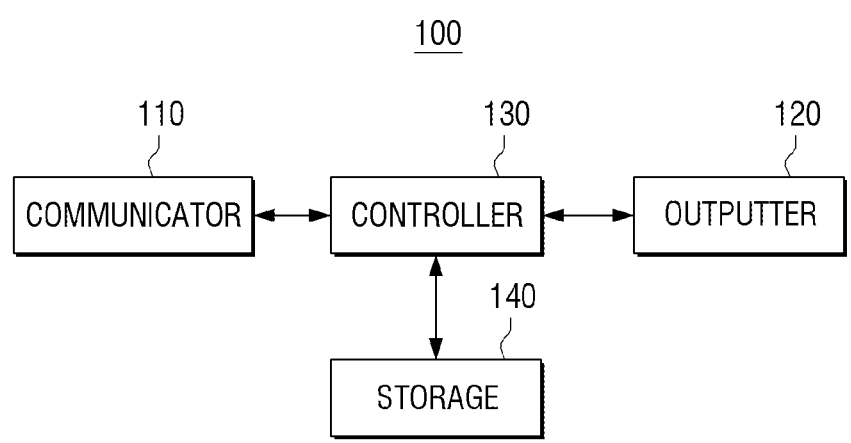
FIG. 3 is a block diagram of an electronic device providing a virtual environment service using a peripheral device according to an embodiment.

FIG. 3 is a block diagram of an electronic device providing a virtual environment service using a peripheral device according to an embodiment.

As illustrated in FIG. 3, the electronic device 100 is a device for reproducing the virtual environment content. Here, the virtual environment content is a VR image content such as a panorama image or a 360-degree around view, and the electronic device 100 which reproduces the virtual environment content may be a VR device, a smartphone, a VR wearable device, and the like.

The electronic device 100 includes a communicator 110, an outputter 120, a controller 130, and a storage 140.

The communicator 110 performs data communication with at least one peripheral device 200. The communicator 110 may include a local area communication module 111 and perform data communication with at least one peripheral device 200 through the local area communication module 111.

Here, the local area communication module 111 is a module for performing wireless communication with the at least one peripheral device 200 and may include, for example, a Bluetooth module, a near field communication (NFC) module, a Wi-Fi module, and a Zigbee module.

The communicator 110 may transmit and receive a signal for pairing with at least one peripheral device 200 through the local area communication module 111, and transmit a control signal for performing a function corresponding to the virtual effect provided by the virtual environment content to the at least one peripheral device 200 pre-registered in the electronic device 100.

In addition, the communicator 110 may further include a wireless communication module 112 and a connector 113.

The wireless communication module 112 is a module connected to an external network for communication according to wireless communication method such as institute of electrical and electronics engineers (IEEE), and the like, as the wireless LAN module. However, the embodiment is not limited thereto, and the wireless communication module 112 may further include a mobile communication module for performing communication by accessing a mobile communication network according to various mobile communication standards such as 3rd Generation (3G), 3rd Generation Partnership Project (3GPP), long term evolution (LTE), or the like.

The connector 113 is a configuration that provides an interface with various source devices such as USB 2.0, USB 3.0, high-definition multimedia interface (HDMI), and IEEE 1394. The connector 113 may receive content data transmitted from an external server (not shown) via a wired cable connected to the connector 113 according to a control command of the controller 130 to be described later, or transmit the prestored content data to an external recording medium. Also, the connector 113 may receive power from a power source via a wired cable physically connected to the connector 113.

Figure 7:
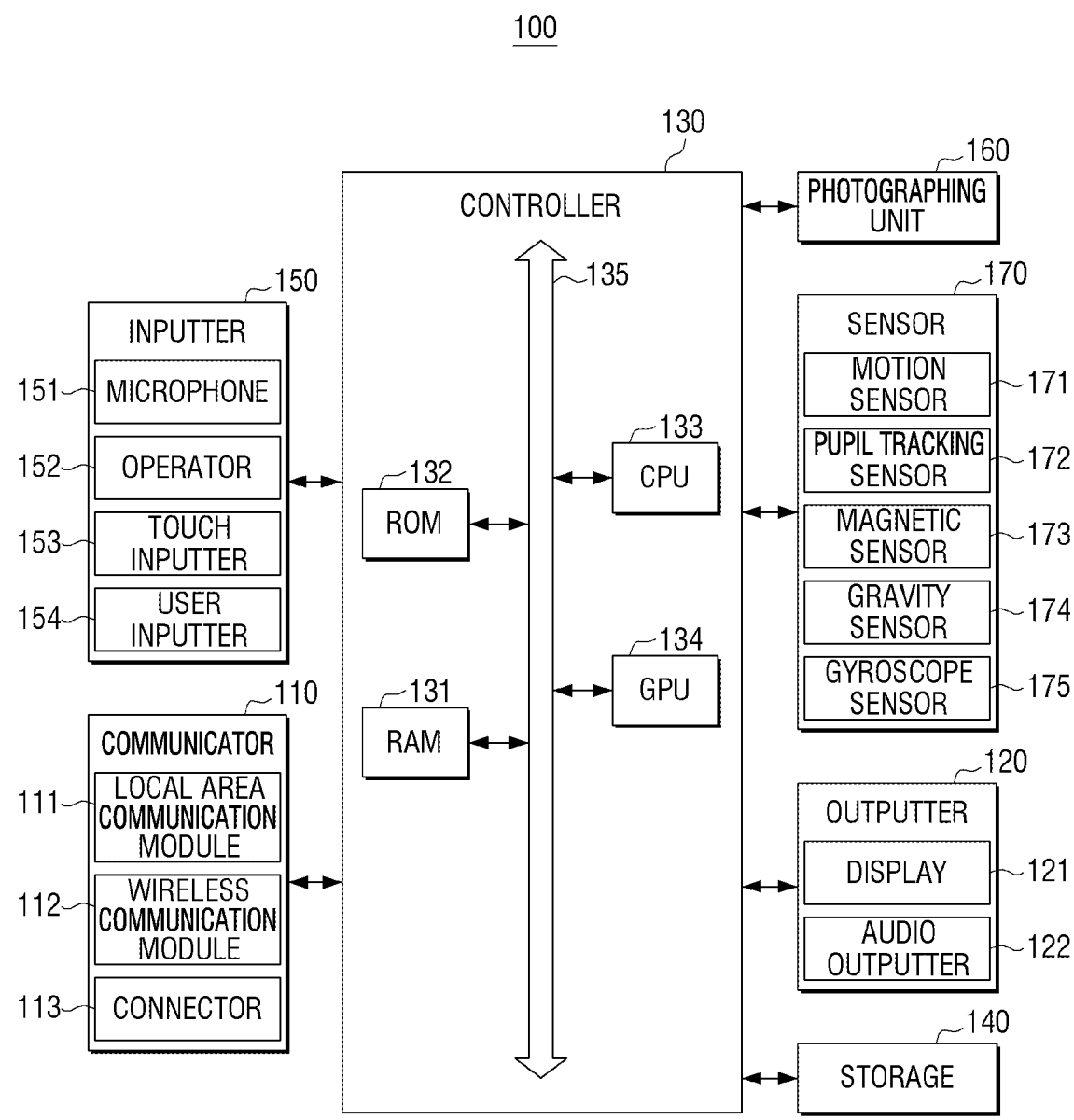
FIG. 7 is a detailed block diagram of the electronic device providing a virtual environment service using a peripheral device according to an embodiment.

The outputter 120 outputs the virtual environment content corresponding to the user's command. The outputter 120 may include a display 121 and an audio outputter 122 as illustrated in FIG. 7 to be described later.

The display 121 displays image data included in the virtual environment content on a screen, and the audio outputter 122 outputs the audio data included in the virtual environment content as an audible sound through a speaker (not shown).

The controller 130 controls the overall operation of the components constituting the electronic device 100. In particular, the controller 130 controls the outputter 120 to reproduce the virtual environment content according to a user command. In addition, the controller 130 determines a peripheral device capable of providing a function corresponding to a virtual effect among the at least one peripheral device 200 based on the information about the virtual effect provided by the virtual environment content. Then, the controller 130 controls the communicator 110 to transmit the control signal corresponding to the virtual effect to the determined peripheral device 200.

The storage 140 stores function support device information to which information on the virtual effect and information on the pre-registered peripheral device 200 capable of providing a function corresponding to the virtual effect are mapped.

To be specific, the controller 130 may generate the function support device information on the peripheral device capable of providing a function corresponding to the virtual effect through various modules stored in the storage 140 and store the information in the storage 140.

Figure 4:
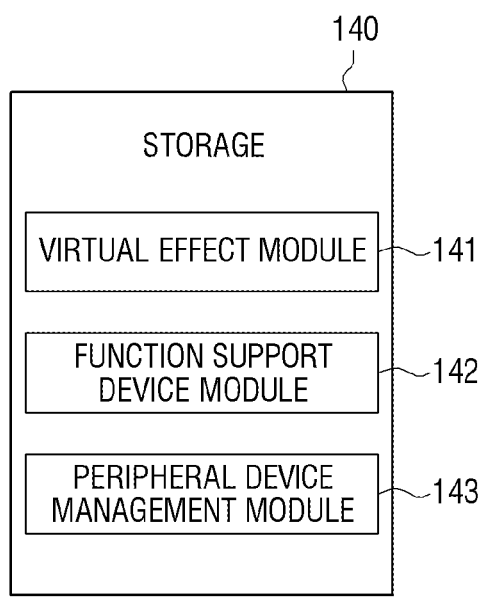
FIG. 4 is a detailed block diagram of a storage according to an embodiment.

FIG. 4 is a detailed block diagram of a storage according to an embodiment.

As illustrated in FIG. 4, the storage 140 includes a virtual effect module 141, a function support device module 142, and a peripheral device management module 143.

The virtual effect module 141 is a module for providing information on the virtual effect which is necessary in relation to providing a virtual environment service.

The function support device module 142 is a module to provide device information for a device capable of providing a function corresponding to each of the virtual effects.

The peripheral device management module 143 is a module to register and control the peripheral device 200 which provides a function corresponding to each of the virtual effects.

Accordingly, the controller 130 may search and register the peripheral device 200 which is capable of providing a function corresponding to each of the virtual effects using a virtual effect module 141, a function support device module 142, and a peripheral device management module 143 prestored in the storage 140. Then, the controller 130 may generate the function support device information to which the information on the virtual effect and the device information on the peripheral device 200 capable of providing a function corresponding to the virtual effect, and store the information in the storage 140.

For example, the peripheral device 200 which may provide a function corresponding to the virtual effect for the "wind effect" may be a smart airconditioner. In this case, the controller 130 may generate the function support device information to which the virtual effect of "wind effect" and the device information of the peripheral device 200 for the smart airconditioner are mapped, through the embodiment as shown below.

More specifically, the controller 130 controls the communicator 110 to transmit a search signal for searching the peripheral device by a broadcasting method. Accordingly, the communicator 110 transmits a search signal for searching a peripheral device in a broadcasting method, through the local area communication module 111. Accordingly, the at least one peripheral device 200 capable of local area communication with the electronic device 100 may, when a search signal is received from the electronic device 100, transmit a response signal to the electronic device 100 based on the received search signal.

When the response signal is received from the at least one peripheral device 200, the controller 130 may determine whether the peripheral device 200 which transmits the response signal may perform the virtual effect function for the "wind effect" based on the device information of the device which is capable of providing a function corresponding to the virtual effect of the "wind effect."

According to an embodiment, the device information may include signal pattern information in a device capable of providing a function corresponding to the virtual effect on a "wind effect." Accordingly, the controller 130 may determine whether the signal pattern information of the device capable of performing a function of the virtual effect on the "wind effect" is similar to the signal pattern included in the received response signal, and determine whether the peripheral device 200 which transmits the response signal may perform a function of the virtual effect on the "wind effect."

As a result of the determination, if it is determined that the virtual effect function may be performed for the "wind effect", the controller 130 controls the communicator 110 to transmit the pairing request signal to the peripheral device 200 that has transmitted the response signal. Accordingly, the communicator 110 may transmit a pairing request signal to the peripheral device 200 that has transmitted the response signal based on the address information included in the response signal, and the peripheral device 200, which has received the pairing request signal, may transmit to the electronic device 100 a pairing response signal including control information for controlling the operation of the peripheral device 200.

Therefore, the controller 130 may generate the function support device information in which the control information of the peripheral device 200 which transmits a pairing response signal and the virtual effect for the "wind effect" are mapped, based on the received pairing response signal, and store the information in the storage 140.

Through the embodiment, when the function support device information is stored in the storage 140, the controller 130 may provide a virtual environment service based on the function support device information stored in the storage 140.

Specifically, when a user command for reproducing the virtual environment content is inputted, the controller 130 determines whether the peripheral device 200 which is capable of providing a function corresponding to the virtual effect provided by the corresponding virtual environment content is registered, based on the device management information prestored in the storage 140.

As a result of the determination, if it is determined that the peripheral device 200 is registered, the controller 130 controls the communicator 110 to transmit, to the peripheral device 200, a control signal for performing a function corresponding to the virtual effect, based on the registered control information of the peripheral device 200. Accordingly, the peripheral device 200 may perform a function corresponding to the virtual effect provided by the virtual environment content corresponding to the user command, based on the control signal received from the electronic device 100.

If it is determined that the peripheral device 200 is not registered, as the result of the determination, the controller 130 transmits a search signal for searching for a peripheral device by a broadcasting method. Thereafter, when a response signal is received from at least one peripheral device 200 receiving the search signal, the electronic device 100 performs pairing with the peripheral device 200 capable of providing a function corresponding to the virtual effect based on the received response signal. Since the operation of performing the pairing with the unregistered peripheral device 200 has been described in detail above, the detailed description will be omitted below.

In the meantime, the information on the virtual effect provided by the virtual environment content as described above may be mapped by frames which constitute the virtual environment content.

In this case, when the virtual environment content is reproduced, the controller 130 may control the communicator 110 to transmit a control signal to the peripheral device 200 capable of performing a function corresponding to the virtual effect by the frames based on the information on the virtual effect by the frames for the virtual environment content.

For example, information about a first virtual effect may be set in relation to a first frame among a plurality of frames constituting the virtual environment content, and information about the second virtual effect may be set in relation to the second frame. In addition, the first peripheral device 200-1 may be a device capable of providing a function corresponding to the first virtual effect, and the second peripheral device 200-2 may be a device capable of providing a function corresponding to the second virtual effect.

In the meantime, the first and second frames may be one frame or a plurality of frames.

In this case, the controller 130 controls the communicator 110 to transmit a control signal for providing the function corresponding to the first virtual effect set for the first frame to the first peripheral device 200-1 at the timing of outputting the content of the first frame. The controller 130 controls the communicator 110 to transmit a control signal for providing a function corresponding to the second virtual effect set in the second frame to the second peripheral device 200-2 at a timing at which the content of the second frame is outputted.

Accordingly, the communicator 110 may transmit, to the first peripheral device 200-1, a control signal to provide a function corresponding to the first virtual effect that is set in the first frame through the local area communication module 111, and transmit, to the second peripheral device 200-2, a control signal for providing a function corresponding to the second virtual effect that is set in the second frame.

Accordingly, the first peripheral device 200-1 may perform an operation corresponding to the first virtual effect that is set for the first frame at a timing when the content of the first frame are outputted, and the second peripheral device 200-2 may perform an operation corresponding to the second virtual effect that is set in the second frame at a timing when the content of the second frame is outputted.

According to an additional aspect, the controller 130 controls the outputter 120 to display a user UI for providing a service for the virtual effect provided by the virtual environment content, upon receiving a reproduction command for the virtual environment content. Accordingly, the outputter 120 may display the user UI through the display 121.

Figure 5:
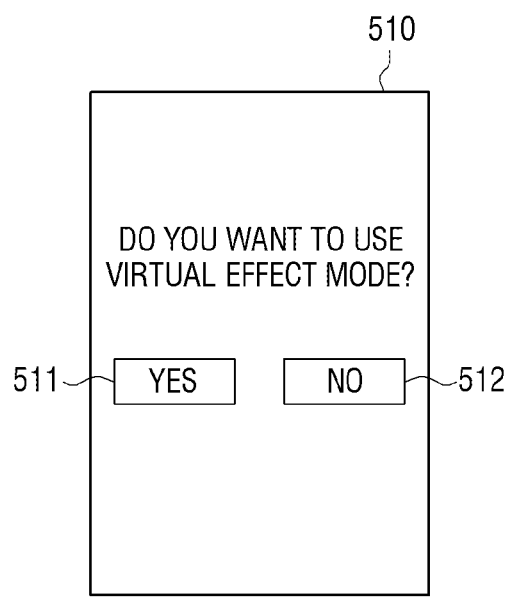
FIG. 5 is an exemplary view illustrating a first user UI for selecting whether to provide a service for the virtual effect according to an embodiment.
Figure 6:
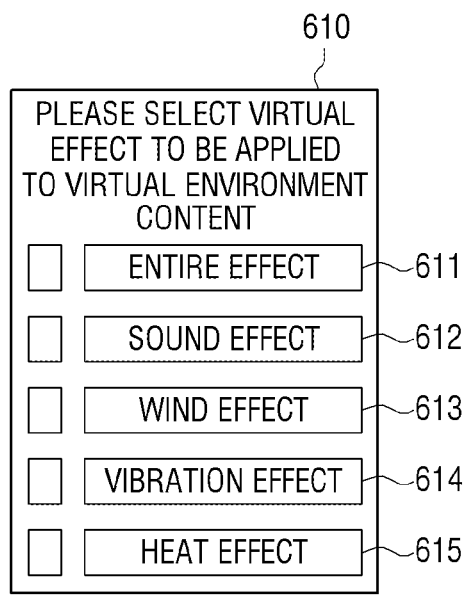
FIG. 6 is an exemplary view illustrating a second user UI for selecting the virtual effect according to an embodiment.

FIG. 5 is an exemplary view illustrating a first user UI for selecting whether to provide a service for the virtual effect according to an embodiment, and FIG. 6 is an exemplary view illustrating a second user UI for selecting the virtual effect according to an embodiment.

As illustrated in FIG. 5, the controller 130 determines whether information about the virtual effect provided by the virtual environment content is set, when a reproduction command for the virtual environment content is received. As the result of the determination, if information on the virtual effect provided by the virtual environment content is set, the controller 130 controls the outputter 120 to display a first user UI 510 for selecting whether to use the virtual effect mode. Accordingly, the outputter 120 displays the first user UI 510 for selecting whether to use the virtual effect mode through the display 121.

When a first icon 511 of "Yes" is selected in the state where the first user UI 510 is displayed, the controller 130 provides a service for the virtual effect provided by the virtual environment content. In the meantime, when a second icon 512 of "No" is selected in the state that the first user UI 510 is displayed, the controller 130 may reproduce only the virtual environment content requested by the user, without providing a service for the virtual effect.

While the first user UI 510 is being displayed, when the first icon 511 of "Yes" is selected, the controller 130 controls the outputter 120 to display a second user UI 610 for selecting the virtual effect, as illustrated in FIG. 6.

That is, when a user command related to use of the service for the virtual effect provided by the virtual environment content is inputted, the controller 130 selects a virtual effect provided by the virtual environment content based on the information on the virtual effect that is set in the corresponding virtual environment content. Thereafter, the controller 130 may generate a second user UI 610 including an icon for selecting all the virtual effects provided by the virtual environment content and each of the virtual effect.

For example, the information about the virtual effect provided by the virtual environment content requested by the user may include a sound effect, a wind effect, a vibration effect, and a heat effect. In this case, the controller 130 may generate the second user UI 610 including the first icon 611 for selecting all the virtual effects provided by the virtual environment content, and second to fifth icons 612-615 for selecting each of the sound effect, wind effect, vibration effect, and heat effect.

When the second user UI 610 is displayed through the display 121, the user may select only a desired virtual effect through the second user UI 610 displayed on the screen. For example, when the first icon 611 for the overall effect is selected, the controller 130 may provide a service for all the virtual effects provided by the virtual environment content requested by the user.

In the meantime, when a second icon 612 for the sound effect and a fourth icon 614 for the vibration effect are selected, the controller 130 may provide only a service for the sound effect and the vibration effect among the virtual effects provided by the virtual environment content requested by the user.

According to an additional aspect, while the virtual environment content is being reproduced, upon receiving event information from the peripheral device 200 which is set by the user, among the pre-registered plurality of peripheral devices 200, the controller 130 may convert the received event information to a video image related to the virtual environment content which reproduces the received event information, and controls the outputter 120 to compose the converted image with the virtual environment content which is being reproduced and output the image. Accordingly, the outputter 120 may display, through the display 121, the virtual environment content in which the converted video image in relation to the event information is composed.

According to an additional aspect, according to whether a function corresponding to the virtual effect provided by the virtual environment content may be performed by the electronic device 100, the controller 130 may transmit a control signal to the peripheral device 200 for performing a function corresponding to the virtual effect provided by the virtual environment content.

For example, the virtual effect provided by the virtual environment content may be the sound effect. In this case, the controller 130 determines whether the electronic device 100 may perform a function corresponding to the sound effect. As the result of the determination, if the function may be performed, the controller 130 may output the audio data included in the virtual environment content through the audio outputter 122 included in the electronic device 100.

In the meantime, when a function corresponding to the sound effect may not be performed by the electronic device 100, the controller 130 may control the communicator 110 to transmit the audio data included in the virtual environment content to the first peripheral device 200-1 which is capable of outputting audio, from among the pre-registered peripheral devices 200. Accordingly, the communicator 110 may transmit the audio data to the first peripheral device 200-1 capable of audio outputting through the local area communication module 111, and the first peripheral device 200-1 may output the audio data received from the electronic device 100 as an audible sound format.

Hereinbelow, the specific configuration of the electronic device 100 according to an embodiment will be further described.

FIG. 7 is a detailed block diagram of the electronic device providing a virtual environment service using a peripheral device according to an embodiment.

As described above, the electronic device 100 may further include an inputter 150, a photographing unit 160, and a sensor 170, in addition to the communicator 110, the outputter 120, the controller 130, and the storage 140.

The inputter 150 is an input means for receiving various user commands and transmitting the command to the controller 130, and may include a microphone 151, an operator 152, a touch inputter 153, and a user inputter 154.

The microphone 151 receives a voice command of a user, the operator may be implemented as a key pad including various function keys, number keys, special keys, character keys, or the like. The touch inputter 153 may be implemented as a touch pad which forms a mutual layer structure with the display 121 described before. In this case, the touch inputter 154 may receive a selection command for icons related to various applications displayed through the display 121.

The user inputter 154 may receive an infrared (IR) signal or a radio frequency (RF) signal to control an operation of the electronic device 100 from the at least one peripheral devices 200 such as a remote controller.

The photographing unit 160 photographs an image about the surrounding environment, and the sensor 170 senses a movement of the electronic device 100 and a movement of pupil of a user wearing the electronic device. According to an embodiment, the sensor 170 may include at least one of a motion sensor 171 for sensing a movement, a pupil tracking sensor 172 capable of tracking a pupil of a user, a magnetic sensor 173, a gravity sensor 174, and a gyroscope sensor 175.

The motion sensor 171 may be an accelerometer sensor which measures acceleration or intensity of impact of the moving electronic device 100.

The pupil tracking sensor 172 which is located at a place close to the eyeball of the user detects a change in a gaze of a user while photographing the pupil of the user. Therefore, the controller 130 may determine a region which the user gazes, from among the image of the displayed virtual environment content, based on the sensing information sensed through the pupil tracking sensor 172, and perform conversion of an image to an image of the determined region.

The magnetic sensor 173 is an electronic compass that may detect an azimuth using a geomagnetic field. The magnetic sensor 173 is a sensor that is used for location tracking, 3D video games, or may be used for a smartphones, a radio, a global positioning system (GPS), a personal digital assistant (PDA), a navigation device, or the like.

The gravity sensor 174 is a sensor for detecting the direction in which gravity acts, and is a sensor which automatically rotates following a moving direction of the electronic device 100, to sense the direction of the electronic device 100.

The gyroscope sensor 175 is a sensor that recognizes the six-axis direction by rotating the conventional motion sensor 171 to recognize a more detailed and precise operation.

In this disclosure, a proximity sensor (not shown) used to determine whether an object has been in proximity to another object, in addition to the above-described configuration, an optical sensor (not shown) which senses received light and converts the light into an electrical signal, or the like.

Meanwhile, as described above, the storage 140 for storing the device management information and the related modules may further store the video and audio data of the virtual environment content received from an external server (not shown). In addition, the storage 140 may further store an operation program for controlling the operation of the electronic device 100. Here, the operation program may be a program that is read and compiled in the storage 140 to operate each configuration of the electronic device 100 when the electronic device 100 is turned on.

To be specific, the controller 130 as described above may further include a random-access memory RAM 131, a read-only memory ROM 132, a central processing unit CPU 133, a graphics processing unit GPU 134, and the RAM 131, the ROM 132, the CPU 133, and the GPU 134 may be interconnected through a bus 135.

The CPU 133 accesses the storage 140 and performs booting using an operating system (O/S) stored in the storage 140. In addition, the CPU 133 performs various operations using various programs, content, data, or the like, stored in the storage 140.

The GPU 134 generates a display screen including various objects such as an icon, an image, a text, or the like. The GPU 134 may obtain attributes such as a coordinate value at which each object is to be displayed, a shape, a size, a color, or the like according to a layout of a screen based on the received control command, and generate a display screen of various layouts including the object.

The ROM 131 stores a command set for booting the system and the like. When the turn-on command is input and power is supplied, the CPU 133 copies the O/S stored in the storage 140 to the RAM 124 according to the instruction stored in the ROM 131, executes O/S to boot the system. When the booting is completed, the CPU 133 may copy various programs stored in the storage 140 to the RAM 132, execute programs copied to the RAM 132, and perform various operations.

The controller 130 may be implemented as a system-on-a-chip or system on chip (SOC, SoC), in combination with the configurations described above.

The operation of the controller 130 may be performed by a program stored in the storage 140. The storage 140 may be implemented as the ROM 131, RAM 132, a memory card (e.g., an SD card, a memory stick, etc.) capable of being attached to or detached from the electronic device 100, various non-volatile memories, a volatile memory, a hard disk drive (HDD), or a solid state drive (SSD), or the like.

Hereinbelow, an operation to provide a service by the electronic device 100 for the virtual effect provided by the virtual environment content using the peripheral device 200 will be further described.

Figure 8:
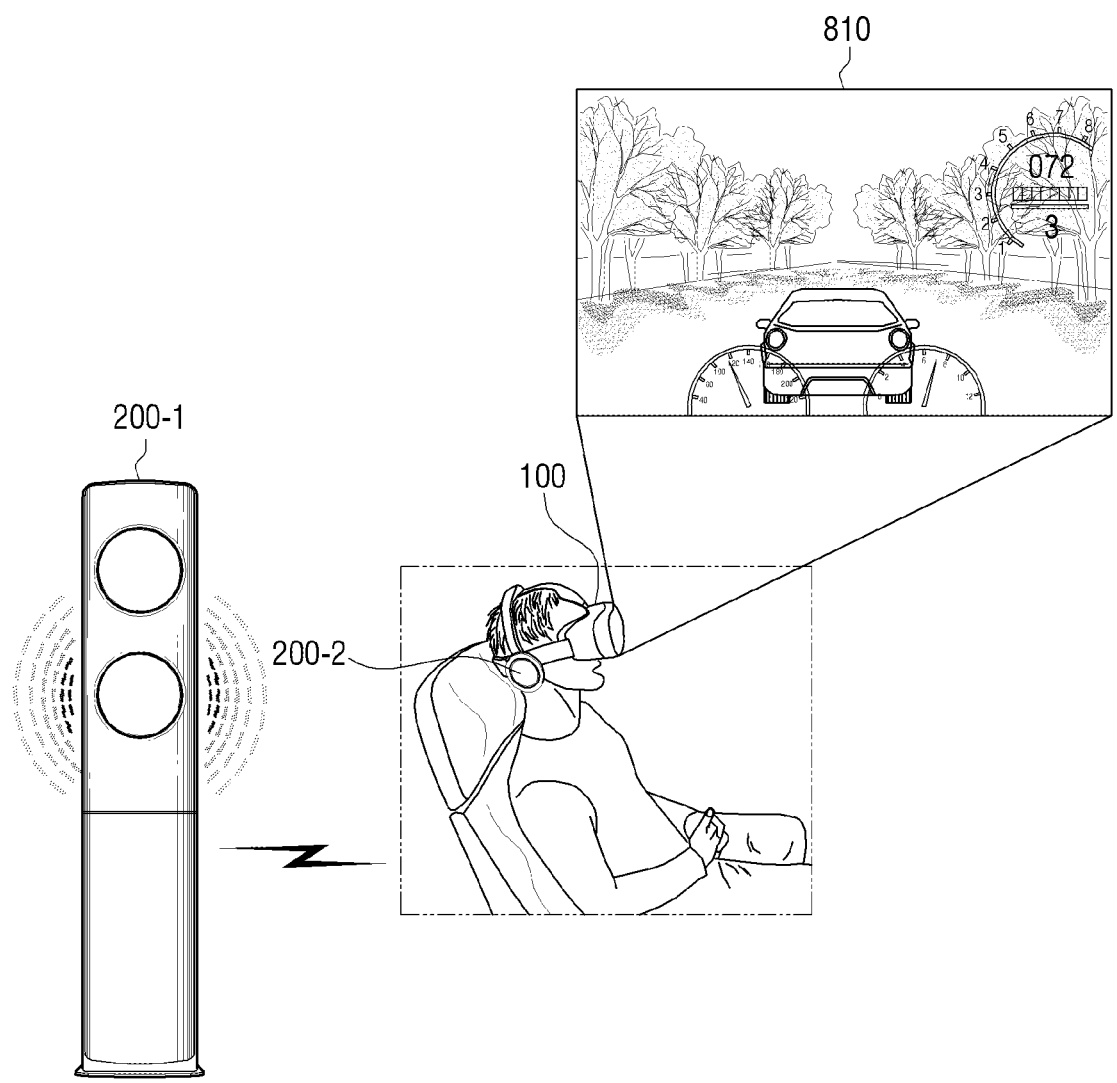
FIG. 8 is a first exemplary view providing a service for the virtual effect provided by the virtual environment content using a peripheral device by the electronic device according to an embodiment.

FIG. 8 is a first exemplary view providing a service for the virtual effect provided by the virtual environment content using a peripheral device by the electronic device according to an embodiment.

As shown in FIG. 8, a user wearing the electronic device 100 may give a reproduction command for virtual environment content 810 related to a car racing game. According to the reproduction command, the electronic device 100 may reproduce the virtual environment content 810 related to the car racing game requested by the user. In the meantime, the electronic device 100 determines whether information on the virtual effect provided by the virtual environment content 810 is included, ahead of reproducing the virtual environment content 810.

As a result of the determination, the information on the virtual effect provided by the virtual environment content 810 may include information on the "heat effect", "wind effect", and "sound effect."

In this case, the electronic device 100 determines the peripheral device 200 capable of providing a function corresponding to the virtual effect for the "heat effect", "wind effect", and "sound effect" based on the prestored device management information and the information on the "heat effect", "wind effect", and "sound effect".

As illustrated, the first peripheral device 200-1 related to heating and cooling airconditioner, from among the pre-registered peripheral devices 200, is a device capable of providing a function for "heat effect" and "wind effect" and the second peripheral device 200-2 related to a smart earphone may be a device which is capable of providing a function for "sound effect."

As such, if it is determined that the first and second peripheral devices 200-1 and 200-2 are devices which may provide a function for the virtual effect provided by the virtual environment content 810, the electronic device 100 transmits a control signal related to warm wind to the first peripheral device 200-1 so that warm wind blows around the user while the virtual environment content 810 requested by the user is being reproduced.

Accordingly, the first peripheral device 200-1 related to the airconditioner blows out warm wind while the virtual environment content 810 is reproduced based on the control signal received from the electronic device 100. Also, the electronic device 100 transmits the audio data included in the virtual environment content 810 requested by the user to the second peripheral device 200-2. Accordingly, the second peripheral device 200-2 related to the smart earphone may output audio for the virtual environment content 810 based on the received audio data.

Therefore, a user who plays a car racing game through the electronic device 100 may experience a virtual environment such as playing a car racing on a desert through the audio outputted from the second peripheral device 200-2 and the warm wind blown from the first peripheral device 200-1.

The embodiment is not limited thereto, and as illustrated in FIGS. 5 and 6, the electronic device 100 may provide a service for the virtual effect selected by the user, among a plurality of virtual effects provided by the virtual environment content 810.

As the example described above, the information on the virtual effect provided by the virtual environment content 810 may include the information on the "heat effect," "wind effect," and "sound effect," and the information on the "heat effect" and "wind effect" may be selected.

In this case, the electronic device 100 transmits the control signal related to warm wind to the first peripheral device 200-1 so that warm wind blows around the user while the virtual environment content 810 requested by the user is being reproduced. Accordingly, the first peripheral device 200-1 related to the heating and cooling airconditioner sends out the warm wind based on the control signal received from the electronic device 100. Therefore, the user who plays a car racing game through the electronic device 100 may experience a virtual environment such as playing a car racing in the desert through the warm wind blown from the first peripheral device 200-1.

Figure 9:
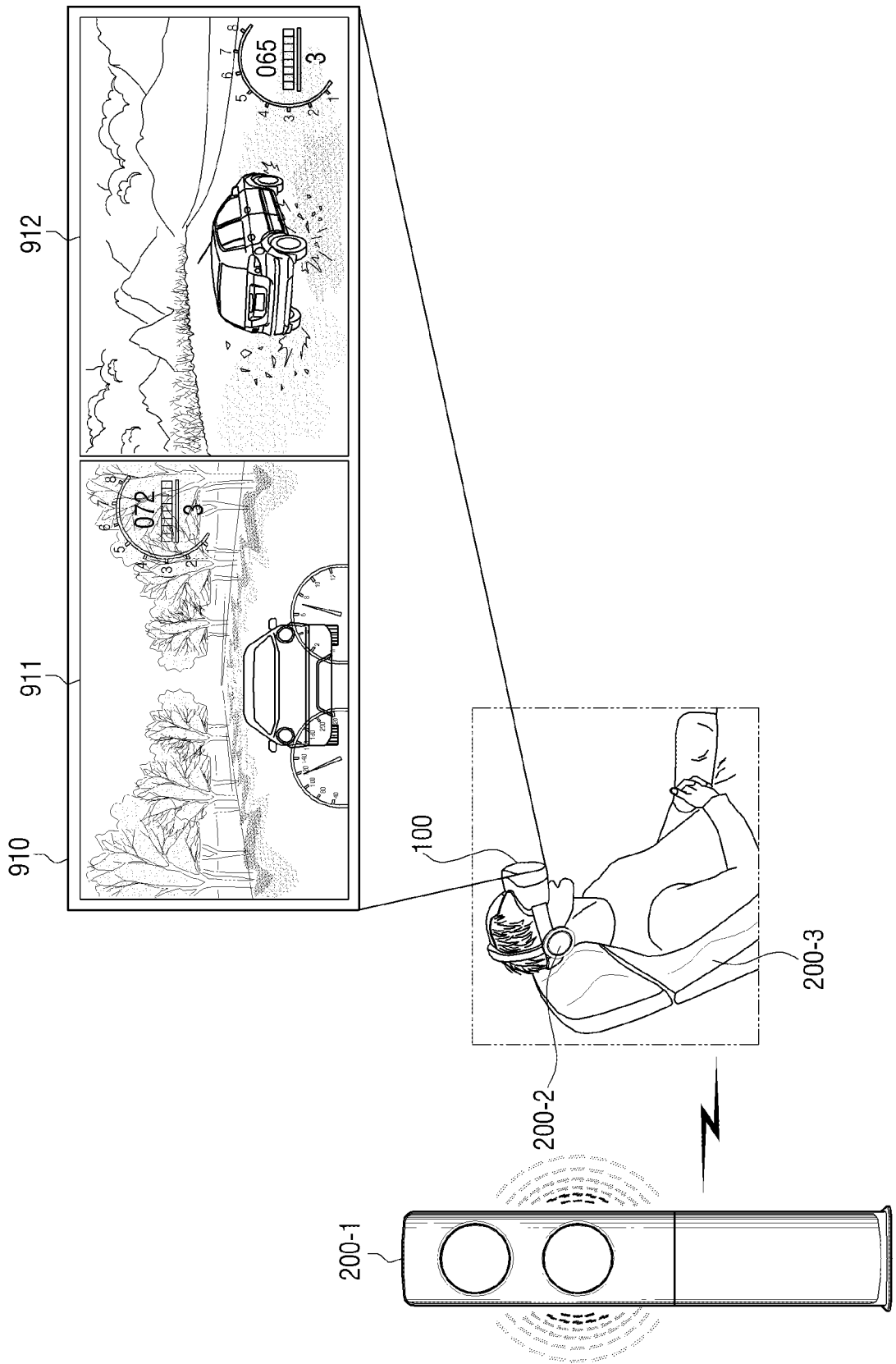
FIG. 9 is a second exemplary view providing a service for the virtual effect provided by the virtual environment content using a peripheral device by the electronic device according to still another embodiment.

FIG. 9 is a second exemplary view providing a service for the virtual effect provided by the virtual environment content using a peripheral device by the electronic device according to still another embodiment.

As shown in FIG. 9, the user who wears the electronic device 100 may give a reproduction command for virtual environment content 910 related to the car racing game. According to the reproduction command, the electronic device 100 may reproduce the virtual environment content 910 related to the car racing game requested by the user. In the meantime, the electronic device 100 determines whether information on a virtual effect provided by the virtual environment content 910 is included, ahead of reproducing the virtual environment content 910.

As a result of the determination, the virtual effect information provided by the virtual environment content 910 may include information on "heat effect", "wind effect", "sound effect", and "vibration effect". Specifically, information on "heat effect", "wind effect" and "sound effect" may be included in relation to an image 911 of the first frame among a plurality of frames constituting the virtual environment content 910. In addition, information on "heat effect", "wind effect", "sound effect" and "vibration effect" may be included in relation to an image 912 of the second frame. Here, the first and second frames may be a single frame or a frame composed of a plurality of frames. Here, the first and second frames may be a single frame or a frame constituted of a plurality of frames.

In this case, the electronic device 100 determines the peripheral device 200 capable of providing a function for "heat effect," "wind effect," "sound effect," and "vibration effect" based on the prestored device management information and information on the "heat effect," "wind effect," "sound effect," and "vibration effect".

As illustrated, from among the pre-registered peripheral devices 200, the first peripheral device 200-1 related to heating and cooling airconditioner is a device providing a function for "heat effect" and "wind effect", and the second peripheral device 200-2 related to the smart earphone is a device providing a function for "sound effect," and a third peripheral device 200-3 related to a massage chair may be a device providing a function for "vibration effect."

Then, the electronic device 100 transmits a control signal related to warm wind to the first peripheral device 200-1 so that warm wind blows around the user, while the image 911 of the first frame of the virtual environment content 910 requested by the user is being reproduced, and transmits audio data for the first frame to the second peripheral device 200-2 so that audio of the first frame is outputted, while the image 911 of the first frame is being reproduced.

Accordingly, the first peripheral device 200-1 related to heating and cooling airconditioner may blow warm wind while the image 911 of the first frame of the virtual environment content 910 is being reproduced, based on the control signal received from the electronic device 100, and the second peripheral device 200-2 related to the smart earphone may output the audio of the first frame of the virtual environment content 910 based on the received audio data.

In the meantime, the electronic device 100 may transmit a control signal related to warm wind to the first peripheral device 200-1 so that warm wind blows around the user during which the image 912 of the second frame included in the virtual environment content is being reproduced, and the electronic device 100 transmits the audio data for the second frame to the second peripheral device 200-2 so that the audio of the second frame is outputted while the image 912 of the second frame is being reproduced. Additionally, the electronic device 100 transmits a control signal related to a massage operation to the third peripheral device 200-3 so that a massage function is performed during the section in which the image 912 of the second frame is being reproduced.

Accordingly, the first peripheral device 200-1 related to the heating and cooling airconditioner may blow out warm wind while the image 912 of the virtual environment content 910 is being reproduced, based on the control signal received from the electronic device 100, and the second peripheral device 200-2 related to the smart earphone may output audio for the second frame while the image 912 of the second frame is being reproduced based on the received audio data. In addition, the third peripheral device 200-3 related to the massage device may perform a massage function while the image 912 of the second frame of the virtual environment content 910 is being reproduced.

Therefore, the user who plays the car racing game through the electronic device 100 may experience the virtual environment as if the user does car racing in the desert through the audio outputted from the second peripheral device 200-2 and the warm wind blown from the first peripheral device 200-1.

In addition, the user who plays the car racing game through the electronic device 100 may experience the virtual environment as if the user does car racing in an unpaved road in the desert by the massage operation performed by the third peripheral device 200-3.

Figure 10:
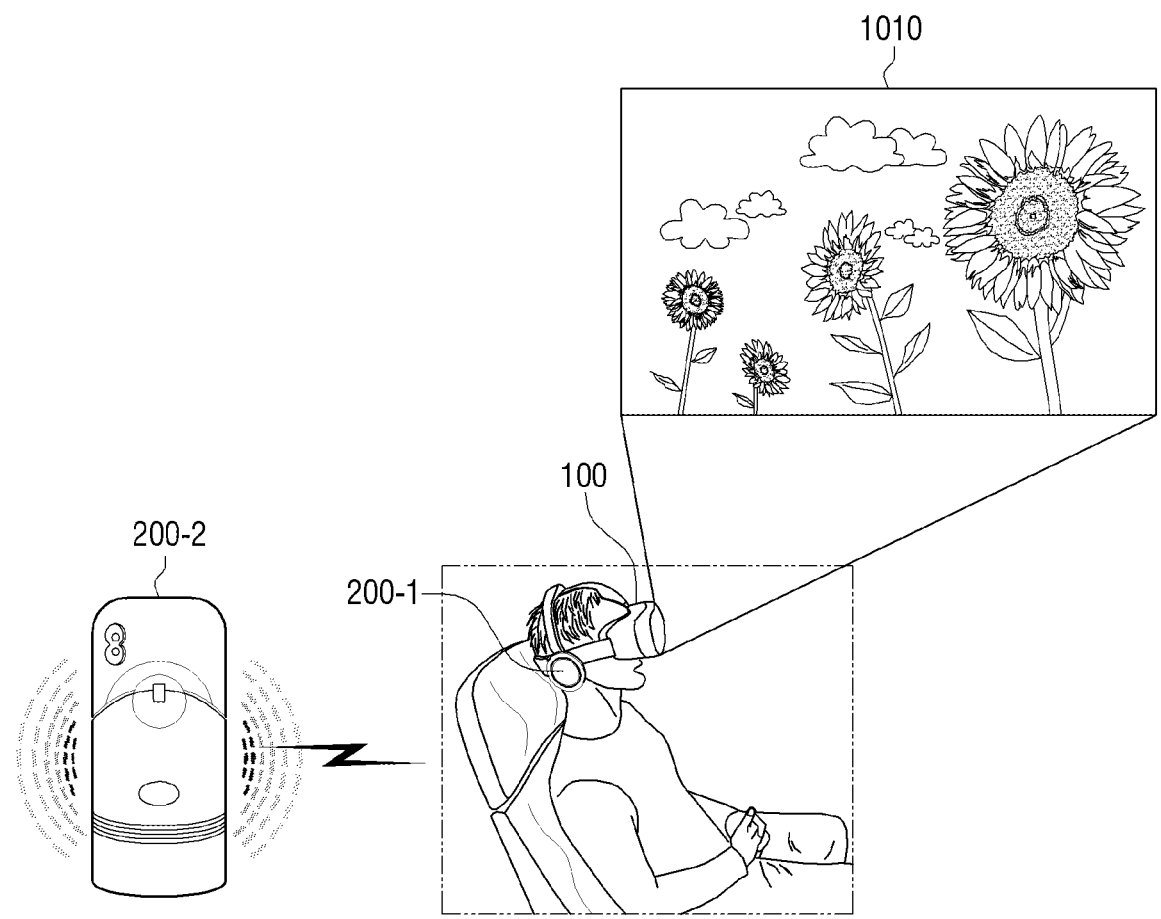
FIG. 10 is a third exemplary view providing a service for the virtual effect provided by the virtual environment content using a peripheral device by the electronic device according to still another embodiment.

FIG. 10 is a third exemplary view providing a service for the virtual effect provided by the virtual environment content using a peripheral device by the electronic device according to still another embodiment.

As illustrated in FIG. 10, the electronic device 100 may reproduce virtual environment content 1010 with a background of a park according to a user's command. In the meantime, ahead of reproducing the virtual environment content 1010, the electronic device 100 determines whether information on the virtual effect provided by the virtual environment content 1010 is included.

As a result of the determination, information on the virtual effect provided by the virtual environment content 1010 may include information on "sound effect" and "odor effect".

In this case, the electronic device 100 determines the peripheral device 200 which is capable of providing a function corresponding to the virtual effect regarding "sound effect" and "odor effect" based on the prestored device management information and information on "sound effect" and "odor effect."

As illustrated, the first peripheral device 200-1 related to the smart earphone, from among the pre-registered peripheral devices 200, may be a device capable of providing a function for the "sound effect," and the second peripheral device 200-2 related to the aromatic device may be a device capable of providing a function for "odor effect."

As such, if it is determined that the first and second peripheral devices 200-1 and 200-2 are devices capable of providing a function for the virtual effect provided by the virtual environment content 1010, the electronic device 100 transmits the audio data included in the virtual environment content 1010 to the first peripheral device 200-1 while the virtual environment content 1010 requested by the user is reproduced. In addition, the electronic device 100 transmits a control signal related to the aromatic device operation to the second peripheral device 200-2 so that a flower scent is generated around the user while the virtual environment content 1010 requested by the user is reproduced.

Accordingly, the first peripheral device 200-1 related to the smart earphone may output the audio for the virtual environment content 1010 based on the audio data received from the electronic device 100. In addition, the second peripheral device 200-2 related to the aromatic device may spray the inside air freshener to the outside through a nozzle of the aromatic device based on the control signal received from the electronic device 100, while the virtual environment content 1010 is being reproduced.

Accordingly, the user who views the image of the background of the part through the electronic device 100 may experience as if the user strolls in the park filled with flowers through the audio which is output from the first peripheral device 200-1 and the air freshener sprayed from the second peripheral device 200-2.

Figure 11:
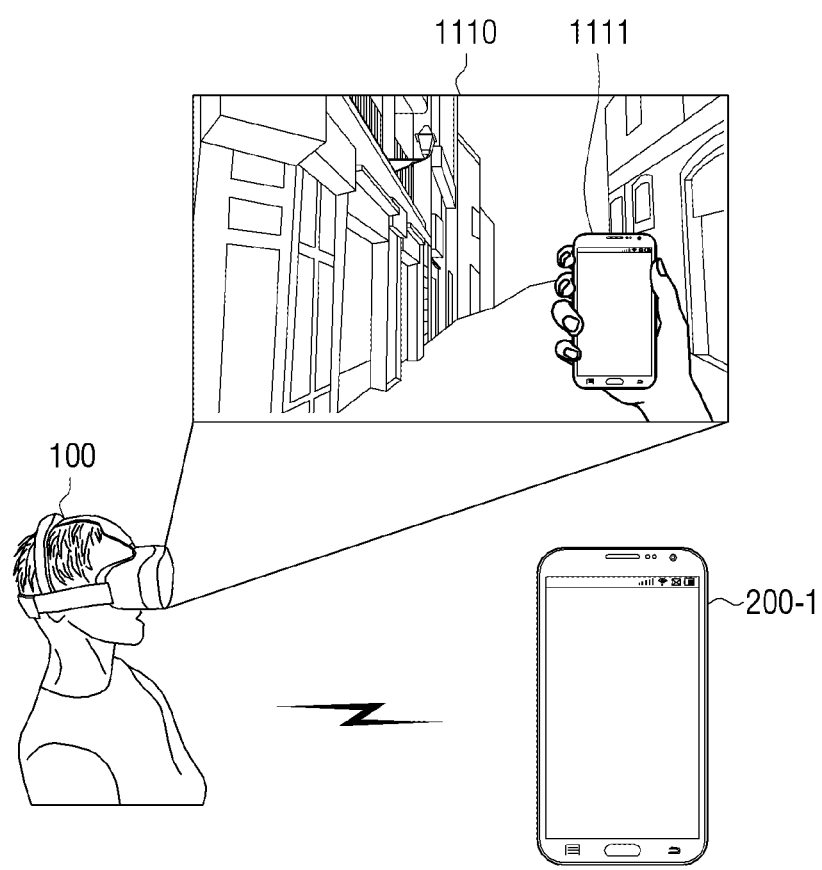
FIG. 11 is an exemplary view in which the electronic device links event information of the peripheral device with the virtual environment content and provides the same according to an embodiment.

FIG. 11 is an exemplary view in which the electronic device links event information of the peripheral device with the virtual environment content and provides the same according to an embodiment.

As illustrated in FIG. 11, the electronic device 100 may reproduce the virtual environment content 1110, in response to the user's command. Therefore, the user wearing the electronic device 100 may experience the virtual environment from the virtual environment content 1110 which is reproduced by the electronic device 100.

In the meantime, the user may select the first peripheral device 200-1 which is a smartphone, from among a plurality of peripheral devices 200 registered in the electronic device 100, as a device to be interworked with the virtual environment content.

As such, when the first peripheral device 200-1 is selected as the device to be interworked with the virtual environment content, the selected first peripheral device 200-1 may, when an event occurs, transmit the information on the occurred event to the electronic device 100.

For example, the first peripheral device 200-1 may receive a text message transmitted from another peripheral device 200. When the text message related event occurs, the first peripheral device 200-1 transmits the event information including the received text message to the electronic device 100.

When the event information is received from the first peripheral device 200-1, the electronic device 100 that is reproducing the virtual environment content 1110 generates a video image for providing a text message included in the received event information in consideration of the virtual environment content 1110 which is being reproduced, compose the generated video message with the video data of the virtual environment content 1110 being reproduced, and display the composed image.

As illustrated, the electronic device 100 may reproduce the virtual environment content 1110 that allows the user to experience a virtual environment for sightseeing a specific area. When the event information including the text message is received from the first peripheral device 200-1 during the reproduction of the virtual environment content 1110, the electronic device 100 composes a video image 1111 related to the smartphone in which the text message included in the received event information with the video data and displays the composed image.

Accordingly, the user wearing the electronic device 100 may experience the virtual environment in which the user sightsees a specific area and the virtual environment in which the text message is received by the user's smartphone while sightseeing the specific area, through the video image 1111 related to the smartphone which is composed with the virtual environment content 1110 which is being reproduced through the electronic device 100.

Figure 12:
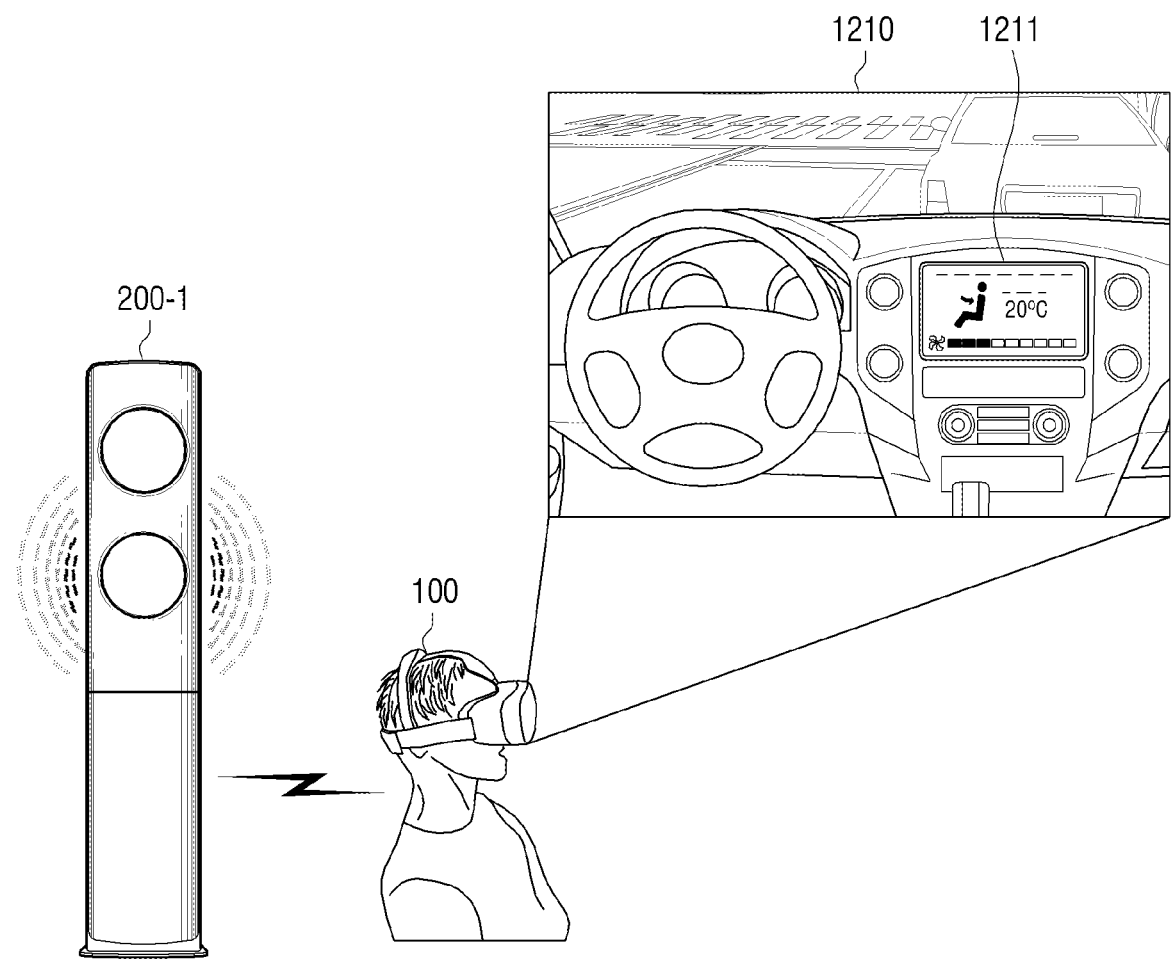
FIG. 12 is an exemplary view in which the electronic device links event information of the peripheral device with the virtual environment content and provides the same according to still another embodiment.

FIG. 12 is an exemplary view in which the electronic device links event information of the peripheral device with the virtual environment content and provides the same according to still another embodiment.

As illustrated in FIG. 12, according to the reproduction command for virtual environment content 1210 related to the car racing game, the electronic device 100 may determine whether the information on the virtual effect provided by the virtual environment content 1210 is included.

As a result of the determination, the electronic device 100 may determine that the information of the virtual effect provided by the virtual environment content 1210 includes information on the "cold air effect" and the "wind effect", and the first peripheral device 200-1 related to heating and cooling airconditioner may provide functions for "cold air effect" and "wind effect."

Thereafter, the electronic device 100 transmits a control signal related to cool wind to the first peripheral device 200-1 so that cold wind blows around the user while the virtual environment content 1210 is being reproduced.

Accordingly, the first peripheral device 200-1 related to the heating and cooling airconditioner blows out cold wind while the virtual environment content 1210 is reproduced based on the control signal received from the electronic device 100. In addition, the first peripheral device 200-1 transmits event information including the set temperature set in the first peripheral device 200-1 to the electronic device 100.

When the event information is received from the first peripheral device 200-1, the electronic device 100, which is reproducing the virtual environment content 1210, may generate the video image for providing the set temperature included in the received event information in consideration of the virtual environment content 1210 which is being reproduced, compose the generated video message with the video data of the virtual environment content 1210 which is being reproduced, and display the composed image.

As illustrated, the electronic device 100 may reproduce virtual environment content 1210 in which the user may experience a virtual environment in which the user does car racing. While the virtual environment content 1210 is being reproduced, when the event information including the set temperature is received from the first peripheral device 200-1, the electronic device 100 may compose and reproduce the video image 1211 regarding the set temperature on the display screen of the car driven by the user in the virtual environment.

Accordingly, the user wearing the electronic device 100 may check the temperature which is set to the first peripheral device 200-1 through the display screen of the car driven by the user in the virtual environment for car racing through the electronic device 100.

Hereinbelow, a method for providing the virtual environment service by the electronic device 100 through the peripheral device 200 will be described in greater detail.

Figure 13:
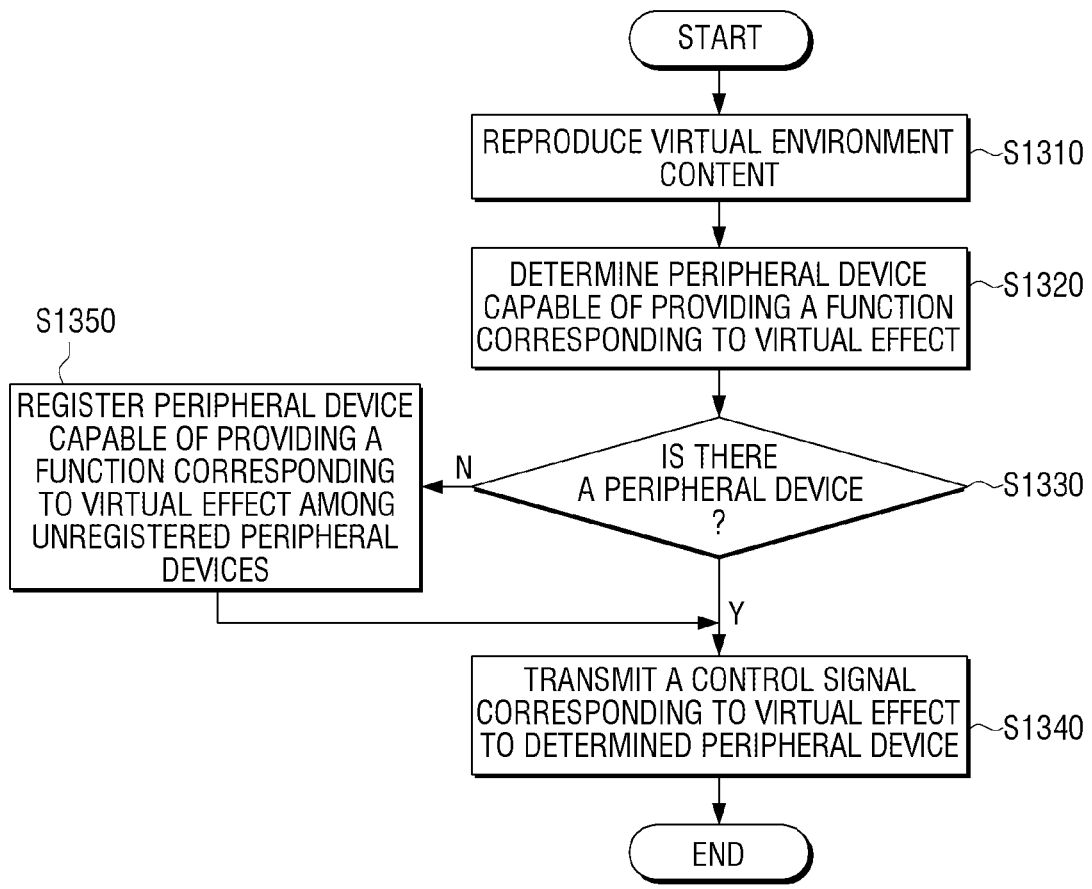
FIG. 13 is a flowchart of a method for providing the virtual environment service using the peripheral device according to an embodiment.

FIG. 13 is a flowchart of a method for providing the virtual environment service using the peripheral device according to an embodiment.

As illustrated in FIG. 13, the electronic device 100 reproduces the virtual environment content according to a user command in step S1310. Thereafter, the electronic device 100 determines the peripheral device 200 which is capable of providing a function corresponding to the virtual effect, from among at least one peripheral devices, based on information of the virtual effect provided by the virtual environment content in step S1320.

Here, the information on the virtual effect may include at least one of the sound effect, wind effect, vibration effect, cold air effect, heat effect, and odor effect.

As a result of the determination, when there is the peripheral device 200 which is capable of providing a function corresponding to the virtual effect exists, the electronic device 100 transmits a control signal corresponding to the virtual effect to the peripheral device 200 capable of providing a function corresponding to the virtual effect in steps S1330 and S1340.

To be specific, the electronic device 100 may determine whether there is the peripheral device 200 which is capable of providing a function corresponding to the virtual effect based on prestored function support device information. Here, the function support device information may be information in which the information on the virtual effect and information on the pre-registered peripheral device 200 which is capable of providing a function corresponding to the virtual effect are mapped.

Therefore, the electronic device 100 determines whether the peripheral device 200 which is capable of providing a function corresponding to the virtual effect provided by the virtual environment content requested by the user, based on the prestored function support device information, is registered. As a result of determination, if it is determined that the peripheral device 200 which is capable of providing a function corresponding to the virtual effect is registered, the electronic device 100 transmits a control signal or performing a function corresponding to the virtual effect to the registered peripheral device 200.

Meanwhile, the information about the virtual effect provided by the virtual environment content may be mapped and stored according to the frames constituting the virtual environment content. In this case, when reproducing the virtual environment content requested by the user, the electronic device 100 may transmit a control signal to the peripheral device 200 capable of providing a function corresponding to the virtual effect by the frames based on the information on the virtual effect by frames for the virtual environment content to be reproduced.

Accordingly, the peripheral device 200 may perform a functional operation corresponding to the virtual effect based on the control signal received from the electronic device 100.

In the meantime, if it is determined that the peripheral device 200 which is capable of providing a function corresponding to the virtual effect provided by the virtual environment content requested by the user is not registered, the electronic device 100 may search and register the peripheral device 200 which is capable of providing a function corresponding to the virtual effect, from among the unregistered peripheral devices 200 in step S1350.

In step S1310, upon receiving a reproducing command for the virtual environment content, the electronic device 100 may display a user UI for providing a service for the virtual effect provided by the virtual environment content corresponding to the reproducing command. Therefore, the user may select whether to receive a service for the virtual effect provided by the virtual environment content requested by the user, through the user UI displayed on a screen.

Therefore, the electronic device 100, upon receiving a user command to receive a service for the virtual effect, may perform a series of the operations as described above and provide a service for the virtual effect which may be provided by the virtual environment content requested by the user.

In addition, ahead of determining whether the peripheral device 200 capable of providing a function corresponding to the virtual effect is registered as in step S1320 described above, the electronic device 100 may determine whether the function corresponding to the virtual effect may be performed. As a result of the determination, when the electronic device 100 may perform a function corresponding to the virtual effect, the electronic device 100 may perform a function corresponding to the virtual effect.

According to an additional aspect, in a state in which the virtual environment content requested by the user is being reproduced, when the event information is received from the peripheral device 200 set by the user among the plurality of pre-registered peripheral devices 200, the electronic device 100 may convert the received event information into information related to the virtual environment content being reproduced and reproduce the information.

Hereinafter, a method of registering the peripheral device 200 which may perform a function for the virtual effect provided by the virtual environment content requested by the user, from among the unregistered peripheral devices 200, will be further described.

Figure 14:
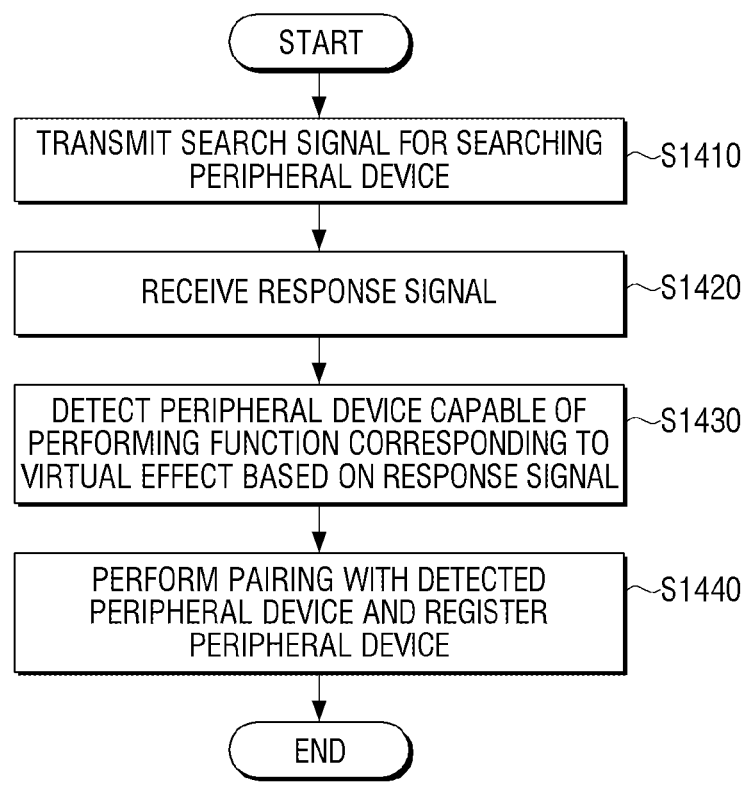
FIG. 14 is a flowchart of a method for registering the peripheral device capable of performing a function for the virtual effect among the unregistered peripheral device by the electronic device according to an embodiment.

FIG. 14 is a flowchart of a method for registering the peripheral device capable of performing a function for the virtual effect among the unregistered peripheral devise by the electronic device according to an embodiment.

As illustrated in FIG. 14, if it is determined that there is no peripheral device 200 which may provide a function corresponding to the virtual effect provided by the virtual environment content requested by a user, the electronic device 100 transmits a search signal for searching a peripheral device in step S1410. At this time, it is preferable that the electronic device 100 transmits a search signal for searching a peripheral device in a broadcasting method.

Accordingly, when at least one peripheral device 200 located close to the electronic device 100 receives the search signal from the electronic device 100, the peripheral device 200 transmits a response signal to the electronic device 100 that transmitted the search signal. Accordingly, when a response signal is received from at least one peripheral device 200 that has received the search signal, the electronic device 100 detects the peripheral device 200 which is capable of performing a function corresponding to the virtual effect provided by the virtual environment content requested by the user based on the received response signal in step S1420 and step S1430.

The electronic device 100 performs pairing with the peripheral device 200 which is capable of performing a function corresponding to the virtual effect provided by the virtual environment content requested by the user and registers the unregistered peripheral device 200 in step S1440.

Thereafter, the electronic device 100 transmits a control signal on the function corresponding to the virtual effect provided by the virtual environment content requested by the user to a newly-registered peripheral device 200. Accordingly, the newly-registered peripheral device 200 may perform a functional operation corresponding to the virtual effect provided by the virtual effect provided by the virtual environment content requested by the user based on the control signal received from the electronic device 100.

The disclosure has been described with reference to the preferred embodiments.

While the disclosure has been shown and described with reference to various embodiments thereof, it will be understood by one of ordinary skill in the art that various changes in form and details may be made therein without departing from the spirit and scope of the disclosure as defined by the appended claims and their equivalents.

What is claimed is:

1. An electronic device comprising:
   a communicator comprising circuitry configured to perform communication with at least one peripheral device;
   a memory storing function support device information to which information on a virtual effect and information on a plurality of pre-registered peripheral devices capable of providing a function corresponding to the virtual effect are mapped;
   a display; and
   a processor configured to:
      control the display to reproduce a virtual environment content and identify whether the information on the virtual effect is included in the virtual environment content according to a user command, wherein the information on the virtual effect is mapped by frames constituting the virtual environment content,
      based on identifying the information on the virtual effect is included in the virtual environment content, identify a peripheral device which is capable of providing the function corresponding to the virtual effect, from among the at least one peripheral device while the virtual environment content is reproduced, based on the information on the virtual effect included in the virtual environment content, and
      control the communicator to transmit a control signal corresponding to the virtual effect by the frames to the identified peripheral device,
   wherein the processor is further configured to, while the virtual environment content is being reproduced, upon receiving event information from the peripheral device which is set by a user from among the plurality of pre-registered peripheral devices, generate a video image for providing the event information based on the virtual environment content, compose the generated video image with a video data of the virtual environment content being reproduced, and control the display to display the composed image, and
   wherein the processor is further configured to control the communicator to transmit the control signal to the identified peripheral device to perform the function corresponding to the virtual effect provided by the virtual environment content according to whether the electronic device is capable of performing the function corresponding to the virtual effect provided by the virtual environment content.

2. The electronic device of claim 1, wherein the processor is further configured to:
   identify whether the peripheral device capable of providing the function corresponding to the virtual effect provided by the virtual environment content is registered based on device management information stored in the memory, and
   based on the peripheral device capable of providing the function corresponding to the virtual effect being registered, control the communicator to transmit the control signal corresponding to the virtual effect to the registered peripheral device.

3. The electronic device of claim 2, wherein the processor is further configured to, based on the identifying that the peripheral device capable of providing the function corresponding to the virtual effect is unregistered, control the communicator to transmit a search signal for searching the peripheral device and receive a response signal from at least one peripheral device which receives the search signal, and control the communicator to perform pairing with the peripheral device which is capable of providing the function corresponding to the virtual effect based on the received response signal.

4. The electronic device of claim 1, wherein the processor is further configured to: based on the virtual environment content being reproduced, control the communicator to transmit the control signal to the peripheral device capable of performing the function corresponding to the virtual effect by the frames based on the information on the virtual effect by the frames for the virtual environment content.

5. The electronic device of claim 1, wherein the processor is further configured to, upon receiving a reproduction command for the virtual environment content, control the display to display a user interface (UI) for providing a service for the virtual effect provided by the virtual environment content.

6. The electronic device of claim 1, wherein the virtual effect comprises at least one of: a sound effect, a wind effect, a vibration effect, a heat effect, or an odor effect.

7. A control method of an electronic device, the control method comprising:
   reproducing a virtual environment content and identifying whether information on a virtual effect is included in the virtual environment content according to a user command, wherein the information on the virtual effect is mapped by frames constituting the virtual environment content;
   based on identifying the information on the virtual effect is included in the virtual environment content, identifying a peripheral device which is capable of providing a function corresponding to the virtual effect, from among at least one peripheral device while the virtual environment content is reproduced, based on the information on the virtual effect included in the virtual environment content; and
   transmitting a control signal corresponding to the virtual effect to the identified peripheral device, wherein the method further comprises:
      storing function support device information to which the information on the virtual effect and information on a pre-registered peripheral device capable of providing the function corresponding to the virtual effect are mapped, while the virtual environment content is being reproduced, upon receiving event information from the peripheral device which is set by a user from among a plurality of pre-registered peripheral devices, generating a video image for providing the event based on the virtual environment content, composing the generated video image with a video data of the virtual environment content being reproduced, and displaying the composed image, and transmitting the control signal to the identified peripheral device to perform the function corresponding to the virtual effect provided by the virtual environment content according to whether the electronic device is capable of performing the function corresponding to the virtual effect provided by the virtual environment content.

8. The control method of claim 7, wherein
the identifying comprises identifying whether the peripheral device capable of providing the function corresponding to the virtual effect provided by the virtual environment content is registered based on device management information stored in a memory, and
the transmitting comprises, based on the peripheral device capable of providing the function corresponding to the virtual effect being registered, transmitting the control signal corresponding to the virtual effect to the registered peripheral device.

9. The control method of claim 8, further comprising: registering an unregistered peripheral device, wherein the registering comprises:
based on the identifying that the peripheral device capable of providing the function corresponding to the virtual effect is unregistered, transmitting a search signal for searching the peripheral device;
receiving a response signal from at least one peripheral device which receives the search signal; and
performing pairing with the peripheral device which is capable of providing the function corresponding to the virtual effect based on the received response signal.

10. The control method of claim 7, wherein the transmitting comprises: based on the virtual environment content being reproduced, transmitting the control signal to the peripheral device capable of performing the function corresponding to the virtual effect by the frames based on the information on the virtual effect by the frames for the virtual environment content.

11. The control method of claim 7, wherein the reproducing comprises, upon receiving a reproduction command for the virtual environment content, displaying a user interface (UI) for providing a service for the virtual effect provided by the virtual environment content.

* * * * *